(12) United States Patent
Murase

(10) Patent No.: US 10,148,842 B2
(45) Date of Patent: *Dec. 4, 2018

(54) READING MODULE, AND IMAGE READING DEVICE/IMAGE FORMING APPARATUS INCLUDING THE READING MODULE

(71) Applicant: KYOCERA Document Solutions Inc., Osaka (JP)

(72) Inventor: Takaaki Murase, Osaka (JP)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/648,822

(22) Filed: Jul. 13, 2017

(65) Prior Publication Data
US 2018/0035002 A1 Feb. 1, 2018

(30) Foreign Application Priority Data

Jul. 28, 2016 (JP) ................. 2016-148099

(51) Int. Cl.
*H04N 1/028* (2006.01)
*H04N 1/193* (2006.01)

(52) U.S. Cl.
CPC ....... *H04N 1/1937* (2013.01); *H04N 1/02835* (2013.01); *H04N 1/02885* (2013.01); *H04N 2201/0094* (2013.01)

(58) Field of Classification Search
CPC ............. H04N 1/02835; H04N 1/1937; H04N 5/2253; H04N 5/2254; H04N 1/02885; H04N 1/1903; H04N 1/1936; H04N 2201/0094

USPC ...... 348/E5.027, E5.028, 335, 374; 358/513, 358/512
See application file for complete search history.

(56) References Cited

U.S. PATENT DOCUMENTS

| | | | | |
|---|---|---|---|---|
| 5,729,331 | A * | 3/1998 | Tanaka ................ | G03F 7/70358 355/53 |
| 6,112,033 | A * | 8/2000 | Yano ................... | G02B 27/2235 396/323 |
| 6,473,243 | B1 * | 10/2002 | Omura ................ | G02B 17/0808 359/364 |
| 6,707,616 | B1 * | 3/2004 | Takahashi .............. | G02B 17/08 359/649 |

(Continued)

FOREIGN PATENT DOCUMENTS

JP 2003-121608 A 4/2003

*Primary Examiner* — Negussie Worku
(74) *Attorney, Agent, or Firm* — Stein IP, LLC

(57) ABSTRACT

A reading module includes: a light source for applying light to a document; an optical system for forming an image as image light from reflected light of the light applied from the light source to the document; and a sensor in which a plurality of sensor chips for converting the image light formed by the optical system to electric signals are disposed in adjacency to one another in a main scanning direction. The optical system includes: a mirror array in which a plurality of reflecting mirrors whose reflecting surfaces are aspheric surfaces are coupled in array in the main scanning direction; and apertures provided between the reflecting mirrors and the sensor chips, respectively, to regulate light quantity of the image light reflected by the individual reflecting mirrors. The specular-surface number of the reflecting mirrors is set to an integral multiple of the number of the sensor chips.

6 Claims, 4 Drawing Sheets

(56) References Cited

U.S. PATENT DOCUMENTS

| | | | |
|---|---|---|---|
| 8,345,325 B2 | 1/2013 | Schmidt et al. | 358/475 |
| 9,350,919 B2* | 5/2016 | Yamasaki | H04N 5/23296 |
| 2002/0024618 A1* | 2/2002 | Imai | H04N 9/3114 |
| | | | 348/743 |
| 2003/0095335 A1* | 5/2003 | Ogi | G02B 3/005 |
| | | | 359/652 |
| 2004/0189853 A1* | 9/2004 | Takeuchi | G02B 13/0085 |
| | | | 348/340 |
| 2005/0168563 A1* | 8/2005 | Shiraishi | B41J 2/473 |
| | | | 347/225 |
| 2005/0253951 A1* | 11/2005 | Fujimoto | H04N 5/2253 |
| | | | 348/335 |
| 2008/0273193 A1* | 11/2008 | Nishiyama | G01N 21/9501 |
| | | | 356/73 |
| 2018/0149861 A1* | 5/2018 | Ouchi | G02B 27/0025 |
| 2018/0152580 A1* | 5/2018 | Murase | H04N 1/02885 |
| 2018/0152581 A1* | 5/2018 | Murase | H04N 1/0306 |
| 2018/0152582 A1* | 5/2018 | Murase | H04N 1/02885 |

* cited by examiner

READING MODULE, AND IMAGE READING DEVICE/IMAGE FORMING APPARATUS INCLUDING THE READING MODULE

INCORPORATION BY REFERENCE

This application is based upon and claims the benefit of priority from the corresponding Japanese Patent Application No. 2016-148099 filed on Jul. 28, 2016, the entire contents of which are incorporated herein by reference.

BACKGROUND

The present disclosure relates to a reading module for reading image light resulting from reflection of light applied to a document, the reading module being for use in digital copiers, image scanners, and the like. The disclosure also relates to an image reading device and an image forming apparatus each including the reading module.

As the reading method for image reading devices which are to be mounted on a multifunction peripheral or the like using electrophotographic process, conventionally available are the CCD (Charge Coupled Device) method which uses charge coupled devices called CCD sensors, and the CIS method which uses photoelectric conversion devices called CMOS (Complementary MOS) sensors.

The CCD method is a method in which image reading is fulfilled by using plural plane mirrors and optical lenses in combination with an image sensor having a ⅕ to ⅑ size relative to a document size so as to form a scaled-down image. A large depth of field can be mentioned as a merit of the CCD method. The term 'depth of field' herein refers to a range over which it seems that a proper focusing has been obtained even though a subject (document in this case) has shifted in an optical-axis direction from an accurately-focused position. This means that a large depth of field allows a scarcely deteriorated image to be read and captured even though the document has shifted from a specified position.

On the other hand, a demerit of the CCD method could be that its optical path length (a traveling distance of light from subject to sensor) is quite long as much as 200 to 500 mm. In image reading devices, the light traveling direction is changed by using a plurality of plane mirrors in order to ensure the optical path length within a space of limited carriage. For this reason, parts count is increased, leading to a cost increase. With a lens used in the optical system, there occurs chromatic aberration due to differences in refractive index attributable to wavelength. Correcting this chromatic aberration necessitates a plurality of lenses. This use of plural lenses also causes a cost increase.

The CIS method is a reading method in which a plurality of erect-image, actual-size rod lenses are arrayed so as to make an image formed on an image sensor similar in size to the document. It can be mentioned as a merit of the CIS method that the optical path length is relatively short such as 10 to 20 mm, leading to a small scale, as compared with the CCD method. Also, since rod lenses alone are used to fulfill image formation, mirrors that would be necessitated for the CCD method are no longer necessary. As a result, the scanner unit on which the CIS sensor is mounted can be provided a thinner type one, hence a simple structure and a resultant lower cost as additional merits. On the other hand, the CIS method, because of its very small depth of field, undergoes significant influences of blurs due to image smears caused by differences in scale factor among individual lenses when the document has shifted in the optical-axis direction from the specified position. As a result, the CIS method has a demerit of incapability of uniformly reading a book document or a depressed-and-projected document.

In recent years, there has been proposed a method in which image reading is fulfilled by using a reflecting mirror array for the imaging optical system, unlike the above-described CCD method and CIS method. In this method, reflecting mirrors are disposed in array so as to form scaled-down, inverted images of the document for their corresponding reading areas, respectively. However, one area is read and imaged by one optical system, unlike the CIS method using a rod lens array. Further, by virtue of adopting a telecentric system for the imaging system, there occur no image smears due to superimposition of images of different scale factors during process of reading the document for individual plural areas. Thus, image blurs are suppressed, and a compound-eye reading method is established.

Furthermore, in this method, in which only mirrors are used in the optical system, chromatic aberration never occurs unlike cases where lenses are used in the optical system. Accordingly, there is no need for correction as to chromatic aberration, allowing the count of elements constituting the optical system to be reduced.

SUMMARY

A reading module in one aspect of the present disclosure includes a light source, an optical system, and a sensor. The light source applies light to a document. The optical system forms an image as image light from reflected light of the light applied from the light source to the document. The sensor is so structured that a plurality of sensor chips for converting the image light formed by the optical system to electric signals are disposed in adjacency to one another in a main scanning direction. The optical system includes: a mirror array in which a plurality of reflecting mirrors whose reflecting surfaces are aspheric surfaces are coupled to one another in array in the main scanning direction; and apertures provided between the reflecting mirrors and the sensor chips, respectively, to regulate light quantity of the image light reflected by the individual reflecting mirrors. The specular-surface number of the reflecting mirrors is set to an integral multiple of the number of the sensor chips.

Still further objects of the disclosure as well as concrete advantages obtained by the disclosure will become more apparent from embodiments thereof described hereinbelow.

DETAILED DESCRIPTION

Figure 1:
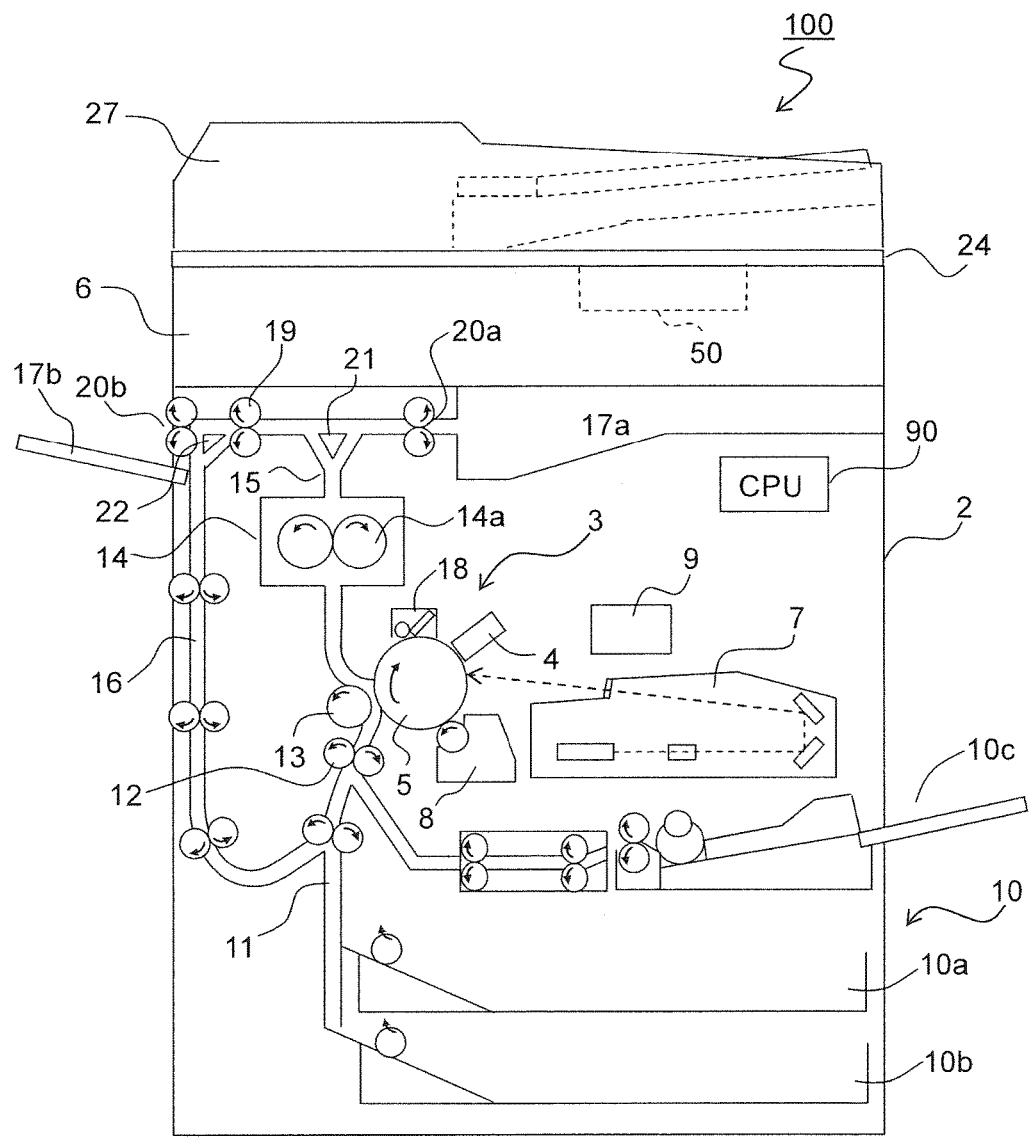
FIG. 1 is a side sectional view showing an overall construction of an image forming apparatus including an image reading part using a reading module of the present disclosure.

Hereinbelow, embodiments of the present disclosure will be described with reference to the accompanying drawings. FIG. 1 is a schematic constructional view of an image forming apparatus 100 including an image reading part 6 using a reading module 50 of the disclosure. Referring to FIG. 1, in the image forming apparatus 100 (exemplified by a digital multifunction peripheral in this case), when copying operation is executed, image data of a document are read and converted to image signals by a later-described image reading part 6. In the meantime, in an image forming part 3 within a multifunction peripheral main body 2, a photosensitive drum 5 which rotates clockwise in FIG. 1 is electrically charged uniformly by a charging unit 4. Then, with a laser beam applied from an exposure unit (e.g., laser scanning unit) 7, an electrostatic latent image based on the document image data read by the image reading part 6 is formed on the photosensitive drum 5. A developer (hereinafter, referred to as toner) is deposited on the formed electrostatic latent image by a developing unit 8, so that a toner image is formed. Toner supply to the developing unit 8 is fulfilled from a toner container 9.

Toward the photosensitive drum 5 with the toner image formed thereon as described above, a sheet of paper is conveyed from a sheet feed mechanism 10 via a sheet conveyance path 11 and a registration roller pair 12 to the image forming part 3. The sheet feed mechanism 10 includes sheet feed cassettes 10a, 10b, and a stack bypass (manual feed tray) 10c provided upward thereof. To the conveyed sheet, by its passing through a nip part between the photosensitive drum 5 and a transfer roller 13 (image transfer part), the toner image on the surface of the photosensitive drum 5 is transferred. Then, the sheet with the toner image transferred thereon is separated from the photosensitive drum 5, and conveyed to a fixing part 14 having a fixing roller pair 14a so that the toner image is fixed. The sheet having passed through the fixing part 14 is classified in conveyance direction by path switching mechanisms 21, 22 provided at a branch point of a sheet conveyance path 15. Thus, the sheet is discharged, as it is (otherwise, after delivered to a reverse conveyance path 16 and subjected to both-side copying), to a sheet discharge part composed of a first discharge tray 17a and a second discharge tray 17b.

Toner remaining on the surface of the photosensitive drum 5 after the transfer of the toner image is eliminated by a cleaning device 18. Also, residual charges on the surface of the photosensitive drum 5 are eliminated by a charge eliminating device (not shown) provided downstream of the cleaning device 18 in a rotational direction of the photosensitive drum 5.

The image reading part 6 is placed in upper part of the multifunction peripheral main body 2. A platen (document holder) 24 for pressing and holding a document placed on a contact glass 25 (see FIG. 2) of the image reading part 6 is provided openable and closable. A document conveyance unit 27 is attached on the platen 24.

Further, a control section (CPU) 90 for controlling operations of the image forming part 3, the image reading part 6, the document conveyance unit 27 and the like is placed within the multifunction peripheral main body 2.

Figure 2:
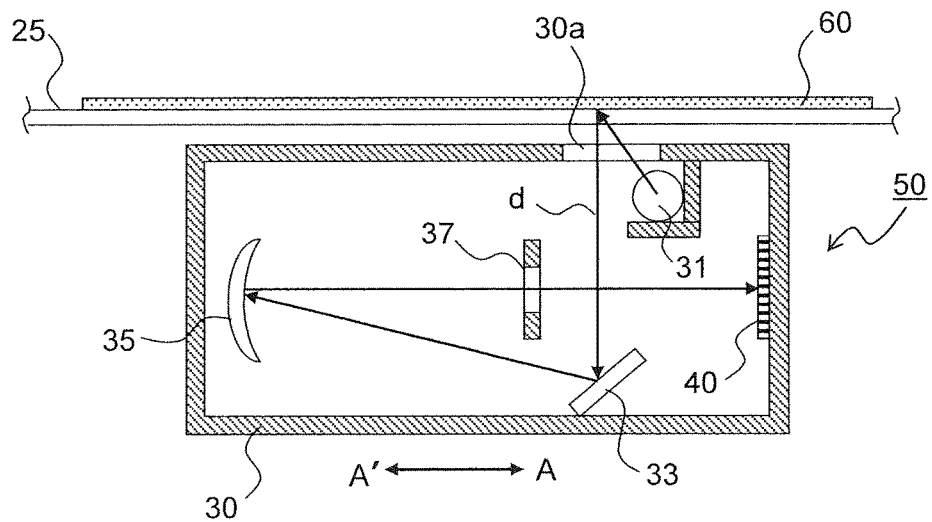
FIG. 2 is a side sectional view showing an internal structure of the reading module according to a first embodiment of the disclosure.
Figure 3:
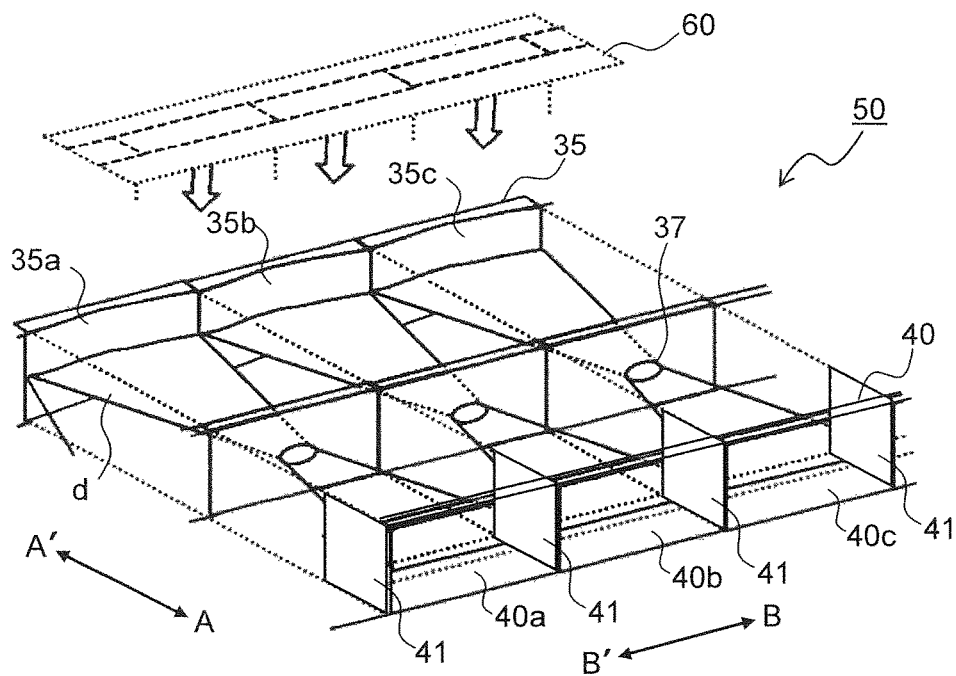
FIG. 3 is a perspective view showing an internal structure of the reading module of the first embodiment.
Figure 4:
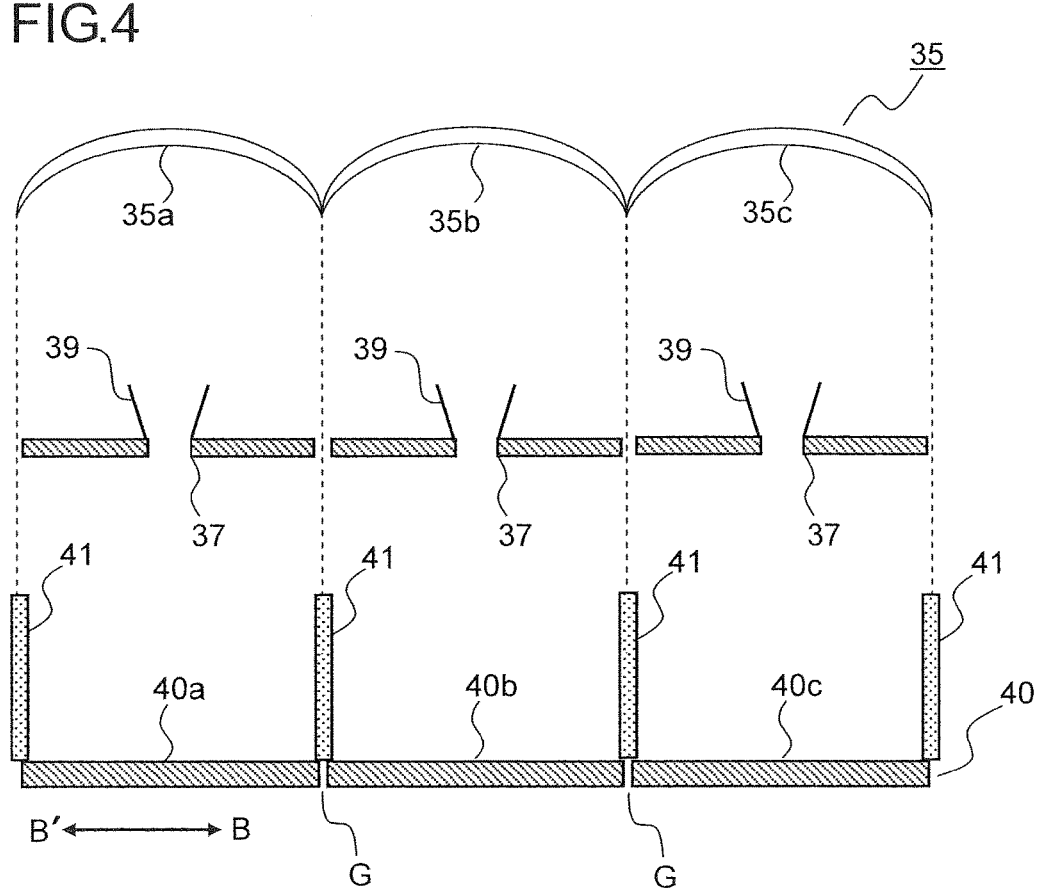
FIG. 4 is a planar sectional view showing a structure of the reading module of the first embodiment, covering from its mirror array to sensor.

FIGS. 2 and 3 are a side sectional view and a perspective view, respectively, showing an internal structure of the reading module 50 to be mounted on the image reading part 6 according to a first embodiment of the disclosure. FIG. 4 is a planar sectional view showing a structure of a range between a mirror array 35 and a sensor 40 within the reading module 50 of the first embodiment. In addition, shading walls 41 shown in FIGS. 3 and 4 are omitted in depiction of FIG. 2. Second apertures 39 are omitted in depiction of FIGS. 2 and 3. The reading module 50 reads an image of the document placed on the contact glass 25 while moving in a sub-scanning direction (arrow AA' direction). The reading module 50 reads a top-side image of the document conveyed by the document conveyance unit 27 (see FIG. 1) in a state in which the reading module 50 is halted immediately under an automatic reading position of the contact glass 25.

As shown in FIG. 2, an optical system and a sensor 40 as a reading means are provided in a housing 30 of the reading module 50. The optical system includes a light source 31, a plane mirror 33, a mirror array 35 composed of plural reflecting mirrors whose reflecting surfaces are aspheric surfaces, first apertures 37, and the like. The sensor 40 is supported by a sensor substrate (not shown). The reading module 50 has a home position located immediately under a shading plate (not shown) provided for acquiring white-color reference data.

For reading of a document image by a document-fixed system with the above-described construction, first, a document 60 is mounted, with its image-side surface facing downward, on the contact glass 25. Then, while the image surface of the document 60 is being irradiated with light from the light source 31, the reading module 50 is moved at a specified speed from scanner home side to scanner return side. As a result, light reflected by the image surface of the document 60 turns into image light d (indicated by solid-line arrow in FIG. 2). The image light d, after changed in optical path by the plane mirror 33, is condensed by the mirror array 35, then passing through the first apertures 37 and making an image formed on the sensor 40. The image light d in the image-forming phase is pixelated in the sensor 40 and converted to electric signals corresponding to densities of individual pixels, followed by image reading.

For reading of a document image by a sheet through method, on the other hand, the reading module 50 is moved to immediately under an image reading area (image reading position) of the contact glass 25. Then, while image-side surfaces of the document 60, which are conveyed in succession under slight press contact toward the image reading area by the document conveyance unit 27, are irradiated with light from the light source 31, image light d reflected by the image-side surfaces is subjected to image formation on the sensor 40 via the plane mirror 33, the mirror array 35, and the first apertures 37, followed by image reading.

As shown in FIGS. 3 and 4, the sensor 40 has a plurality of sensor chips 40a, 40b, 40c, . . . adjacently disposed in a main scanning direction (arrow BB' direction). The mirror array 35 for forming an image of the image light d on the sensor 40 is also so configured that reflecting mirrors 35a, 35b, 35c, . . . corresponding to the sensor chips 40a, 40b, 40c, . . . , respectively, are coupled in array to one another. Then, image light d reflected by the individual areas of the document 60, which are divided in the main scanning direction, is reflected by the plane mirror 33 (see FIG. 2) and subsequently scaled down at a specified scale-down factor by the individual reflecting mirrors 35a, 35b, 35c, . . . . The resulting rays of reflected light pass through the second apertures 39 and the first apertures 37 so as to be imaged on their corresponding sensor chips 40a, 40b, 40c, . . . , respectively.

The sensor 40 used in this embodiment is not a single-sensor-chip type in terms of manufacturing reasons, but has a plurality of sensor chips 40a, 40b, 40c, . . . adjacently disposed in the main scanning direction. Due to this, there exists a gap of about one-pixel extent at each border between the individual sensor chips 40a, 40b, 40c, causing occurrence of lacks of image data between the individual sensor chips 40a, 40b, 40c, . . . . Image-data missing points are interpolated with data by image processing based on image data of neighboring pixels. However, data-interpolated portions are deteriorated to some degrees as images in comparison to other portions that are not data-interpolated.

Accordingly, in this embodiment, the specular-surface number of reflecting mirrors 35a, 35b, 35c, . . . constituting the mirror array 35 is set equal to (one time) the number of sensor chips 40a, 40b, 40c, . . . constituting the sensor 40. With this constitution, as shown in FIG. 4, the borders between the individual reflecting mirrors 35a to 35c and the gaps G between the individual sensor chips 40a to 40c can be made positionally coincident with each other, respectively, blocking the image light d from becoming incident on the gaps G. Accordingly, image reading can be fulfilled without causing any lacks of image data.

Furthermore, for example, when image light d reflected by the reflecting mirror 35b and having passed through the second aperture 39 and the first aperture 37 impinges for image formation on its corresponding sensor chip 40b, there is a possibility that image light d out of the reading area may become stray light to go incident on the sensor chips 40a, 40c neighboring the sensor chip 40b on both sides. Accordingly, in this embodiment, shading walls 41 are provided so as to extend toward the first apertures 37 from the borders of the individual sensor chips 40a, 40b, 40c, . . . .

As a result of this, for example, image light d that impinges for image formation on the sensor chip 40b has its portions except for the reading area blocked by the shading walls 41. Thus, the image light d can be prevented from going incident, as stray light, on the sensor chips 40a, 40c neighboring the sensor chip 40b on both sides. Further, as shown in FIG. 4, since the shading walls 41 are formed so as to cover the gaps G, incidence of the image light d on the gaps G can be prevented more reliably.

Figure 5:
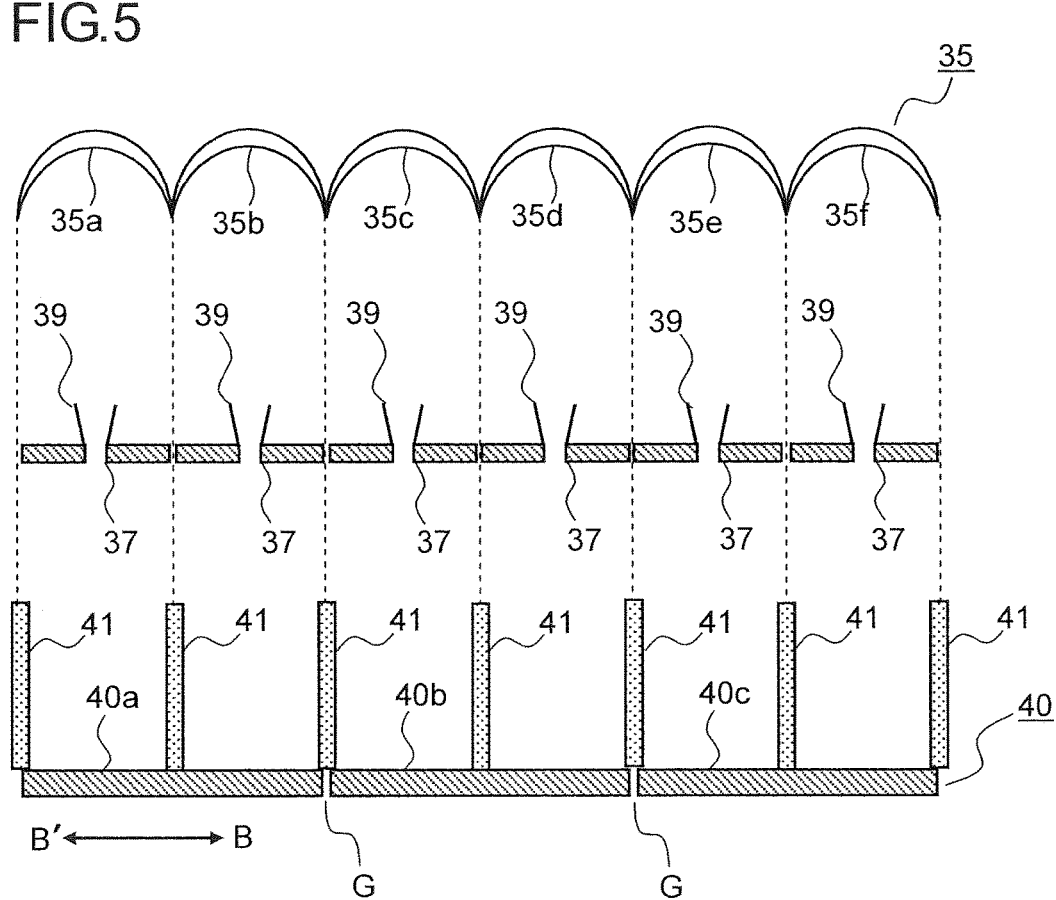
FIG. 5 is a planar sectional view showing a structure of a reading module according to a second embodiment of the disclosure, covering from its mirror array to sensor.

FIG. 5 is a planar sectional view showing a structure of a range between a mirror array 35 and a sensor 40 within a reading module 50 according to a second embodiment of the disclosure. In this embodiment, the specular-surface number of reflecting mirrors 35a, 35b, 35c, . . . constituting the mirror array 35 is set to double the number of sensor chips 40a, 40b, 40c, . . . constituting the sensor 40. That is, reflected light (imaging light) derived from two reflecting mirrors, i.e. reflecting mirrors 35a and 35b, 35c and 35d, 35e and 35f, comes incident on their corresponding one of the sensor chips 40a to 40c, respectively. Also, shading walls 41 are provided at such positions as to cover the gaps G between the individual sensor chips 40a to 40c as well as at widthwise central positions of the individual sensor chips 40a to 40c.

With this constitution, as in the first embodiment, the positions of the gaps G between the sensor chips 40a to 40c are coincident with every other border between the reflecting mirrors 35a to 35f, respectively, so that no image light comes incident on the gaps G. Therefore, image reading can be accomplished without causing any lacks of image data. Furthermore, since some of the shading walls 41 are formed so as to cover the gaps G as shown in FIG. 5, image light can more reliably be prevented from coming incident on the gaps G.

In the above-described first and second embodiments, the specular-surface number of reflecting mirrors 35a, 35b, 35c, . . . constituting the mirror array 35 is set to one time or two times the number of sensor chips 40a, 40b, 40c, . . . constituting the sensor 40. However, the disclosure is not limited to this, and the specular-surface number of reflecting mirrors 35a, 35b, 35c, . . . may be set to three times the number of sensor chips 40a, 40b, 40c, . . . , as an example. That is, when the specular-surface number of reflecting mirrors 35a, 35b, 35c, . . . constituting the mirror array 35 is equal to an integral multiple of the number of sensor chips 40a, 40b, 40c, . . . constituting the sensor 40, the positions of the gaps G between the individual sensor chips 40a to 40c can be made coincident with any one of the border between the individual reflecting mirrors 35a to 35c, respectively.

In addition, under the condition that the specular-surface number of reflecting mirrors 35a, 35b, 35c, . . . is equal to (one time) the number of sensor chips 40a, 40b, 40c, . . . constituting the sensor 40 as in the first embodiment, a mirror width in the main scanning direction (arrow BB' direction) of each of the reflecting mirrors 35a, 35b, 35c, . . . becomes equal to a width in the main scanning direction of each of the sensor chips 40a, 40b, 40c, . . . . As a result, there arises a need for elongating the optical path from the document surface to the sensor 40, leading to an increase in the angle of view as well. Imaging power of the reflecting mirrors 35a, 35b, 35c, . . . is also required.

Meanwhile, as the multiplication factor of the specular-surface number of reflecting mirrors 35a, 35b, 35c, . . . to the number of sensor chips 40a, 40b, 40c, . . . becomes larger such as three times and four times, each mirror width in the main scanning direction (arrow BB' direction) of the reflecting mirrors 35a, 35b, 35c, . . . becomes smaller and smaller. As a result, the angle of view becomes smaller so that imaging performance is more easily obtainable, whereas the number of shading walls 41 to be provided in the sensor 40 becomes larger. Besides, the scale-down factor needs to be enhanced for installation of the shading walls 41.

From the above description, with a view to making it easier to some extent to obtain the imaging performance of the reflecting mirrors 35a, 35b, 35c, . . . as well as to suppressing the number of shading walls 41, it is preferable that, as in the second embodiment, the specular-surface number of reflecting mirrors 35a, 35b, 35c, . . . be set to two times the number of sensor chips 40a, 40b, 40c, . . . constituting the sensor 40.

Otherwise, the present disclosure is not limited to the above-described embodiments, and may be changed and modified in various ways unless such changes and modifications depart from the gist of the disclosure. For example, in the above embodiments, the image reading device is exemplified by the image reading part 6 to be mounted on the image forming apparatus 100. However, the disclosure may also be applied, absolutely similarly, to image scanners to be used independently of the image forming apparatus 100.

The disclosure is applicable to image reading devices including a reading module of a reading method in which reflecting mirrors are disposed in array. Use of the present disclosure makes it practicable to provide a reading module as well as image reading devices and image forming apparatuses including the reading module, the reading module being free from image deteriorations between sensor chips constituting the sensor while the reading module is simple in construction and low in price.

What is claimed is:
1. An image reading unit comprising:
a light source for applying light to a document;
an optical system for forming an image as image light from reflected light of the light applied from the light source to the document; and
a sensor in which a plurality of sensor chips for converting the image light formed by the optical system to electric signals are disposed in adjacency to one another in a main scanning direction, wherein the optical system includes:
- a plane mirror for changing an optical path of the image light,
- a mirror array which is disposed between the plane mirror and the sensor chips and in which a plurality of reflecting mirrors whose reflecting surfaces are aspheric surfaces are coupled to one another in array in the main scanning direction, the image light being imaged on the sensor chips by the reflecting mirrors; and
- apertures provided between the reflecting mirrors and the sensor chips, respectively, to regulate light quantity of the image light reflected by the individual reflecting mirrors, and wherein
- a specular-surface number of the reflecting mirrors is set to an integral multiple of a number of the sensor chips.

2. The image reading unit according to claim 1, further comprising:
- shading walls for blocking stray light from going incident on the sensor chips, the shading walls being formed so as to project from the sensors toward the apertures, wherein
- at least some of the shading walls are formed so as to cover borders of the sensor chips, respectively.

3. The image reading unit according to claim 1, wherein the specular-surface number of the reflecting mirrors is set to double the number of the sensor chips.

4. The image reading unit according to claim 1, wherein the apertures include first apertures provided between the reflecting mirrors and the sensor chips, respectively, and second apertures projecting from opening edges of the first apertures toward the mirror array.

5. An image reading device comprising:
the image reading unit as defined in claim 1;
a contact glass fixed above the image reading unit; and
a document conveyance unit which is openable and closable upwardly relative to the contact glass and which conveys the document to an image reading position of the contact glass, wherein
the image reading unit is enabled to read an image of the document mounted on the contact glass while moving in a sub-scanning direction, and moreover enabled to read an image of the document conveyed to the image reading position while being halted at a position of facing the image reading position.

6. An image forming apparatus including the image reading device as defined in claim 5.

* * * * *